US011967447B2

(12) United States Patent
Nishimura

(10) Patent No.: US 11,967,447 B2
(45) Date of Patent: Apr. 23, 2024

(54) STATIONARY INDUCTION APPARATUS

(71) Applicant: Mitsubishi Electric Corporation, Tokyo (JP)

(72) Inventor: Ryoki Nishimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 654 days.

(21) Appl. No.: 17/274,932

(22) PCT Filed: Nov. 19, 2018

(86) PCT No.: PCT/JP2018/042622
§ 371 (c)(1),
(2) Date: Mar. 10, 2021

(87) PCT Pub. No.: WO2020/105078
PCT Pub. Date: May 28, 2020

(65) Prior Publication Data
US 2022/0037072 A1 Feb. 3, 2022

(51) Int. Cl.
*H01F 27/12* (2006.01)
*H01F 27/02* (2006.01)
(Continued)

(52) U.S. Cl.
CPC ........... *H01F 27/12* (2013.01); *H01F 27/025* (2013.01); *H01F 27/24* (2013.01); *H01F 27/28* (2013.01)

(58) Field of Classification Search
CPC ...... H01F 27/085; H01F 27/10; H01F 27/105; H01F 27/12; H01F 27/125; H01F 27/14;
(Continued)

(56) References Cited

U.S. PATENT DOCUMENTS 6,909,349 B1 * 6/2005 Longardner ............ F28D 20/02
336/60

FOREIGN PATENT DOCUMENTS

JP S50109117 U 9/1975
JP S51149826 U 11/1976
(Continued)

OTHER PUBLICATIONS

International Search Report (PCT/ISA/210) with translation and Written Opinion (PCT/ISA/237) dated Feb. 12, 2019, by the Japan Patent Office as the International Searching Authority for International Application No. PCT/JP2018/042622.
(Continued)

*Primary Examiner* — Tszfung J Chan
(74) *Attorney, Agent, or Firm* — BUCHANAN INGERSOLL & ROONEY PC

(57) ABSTRACT

A stationary induction apparatus includes a core, a winding, a tank, a refrigerant, a radiator, and a unit cooler. The winding is wound around the core as a central axis. The tank contains the core and the winding. The refrigerant is filled into the tank. The radiator is mounted to the tank and includes a first heat exchange unit capable of naturally air-cooling the refrigerant that is naturally convecting while allowing the refrigerant to flow therethrough. The unit cooler is mounted to the tank and includes a pump to forcibly circulate the refrigerant, and a second heat exchange unit to forcibly air-cool the refrigerant that is being forcibly circulated while allowing the refrigerant to flow therethrough.

1 Claim, 3 Drawing Sheets

(51) Int. Cl.
*H01F 27/24* (2006.01)
*H01F 27/28* (2006.01)

(58) Field of Classification Search
CPC .......... H01F 27/16; H01F 27/18; H01F 27/20; H01F 27/24; H01F 27/28; H01F 27/025
USPC ...................... 336/55, 57–58, 61, 90, 92, 94
See application file for complete search history.

(56) References Cited

FOREIGN PATENT DOCUMENTS

| | | | | |
|---|---|---|---|---|
| JP | S5297413 | U | | 7/1977 |
| JP | S55145315 | A | | 11/1980 |
| JP | S56143827 | U | | 10/1981 |
| JP | S57175417 | U | | 11/1982 |
| JP | S61251010 | A | | 11/1986 |
| JP | S6389222 | U | | 6/1988 |
| JP | H0254209 | U | | 4/1990 |
| JP | H03101112 | A | | 4/1991 |
| JP | H06333749 | A | | 12/1994 |
| JP | H11154613 | A | | 6/1999 |
| JP | 2000208337 | A | * | 7/2000 |
| JP | 2001102226 | A | | 4/2001 |
| JP | 2003178922 | A | | 6/2003 |
| JP | 2016207689 | A | * | 12/2016 |

OTHER PUBLICATIONS

Notice of Reasons for Refusal in Japanese Patent Application No. 2019-523112 dated Jun. 11, 2019.

* cited by examiner

STATIONARY INDUCTION APPARATUS

TECHNICAL FIELD

The present invention relates to a stationary induction apparatus.

BACKGROUND ART

Japanese Patent Laying-Open No. 55-145315 (PTL 1) is a prior art document disclosing a transformer including a unit cooler. The transformer described in PTL 1 includes a transformer body having a core and a winding, a case containing the transformer body along with insulating oil, and a cooling device connected to the case.

CITATION LIST

Patent Literature

PTL 1: Japanese Patent Laying-Open No. 55-145315

SUMMARY OF INVENTION

Technical Problem

In recent years, large transformers for use in large-scale photovoltaic power plants have been in increasing demand. Such a transformer is provided with a unit cooler having good cooling efficiency as a cooling device. Although a load on the transformer decreases during the night because of the characteristics of power generation in a photovoltaic power plant, the transformer continues to be energized, causing a no-load loss to continue to occur. The unit cooler does not have a self-cooling capacity, which is a cooling capacity through natural circulation of insulating oil. Thus, the use of the unit cooler as a cooling device requires driving of a pump and a fan of the unit cooler during the night as well in order to suppress a temperature increase in insulating oil caused by the no-load loss, resulting in an auxiliary machinery loss occurring at all times.

If a radiator having a self-cooling capacity is used instead of the unit cooler as a cooling device, the radiator will be installed over a large area in order to ensure required cooling capability, resulting in an increase in size of the transformer.

The present invention was made in view of the problem described above, and has an object to provide a stationary induction apparatus capable of suppressing an increase in size while reducing an auxiliary machinery loss.

Solution to Problem

A stationary induction apparatus based on the present invention includes a core, a winding, a tank, a refrigerant, a radiator, and a unit cooler. The winding is wound around the core as a central axis. The tank contains the core and the winding. The refrigerant is filled into the tank. The radiator is mounted to the tank and includes a first heat exchange unit capable of naturally air-cooling the refrigerant that is naturally convecting while allowing the refrigerant to flow therethrough. The unit cooler is mounted to the tank and includes a pump to forcibly circulate the refrigerant, and a second heat exchange unit to forcibly air-cool the refrigerant that is being forcibly circulated while allowing the refrigerant to flow therethrough.

Advantageous Effects of Invention

According to the present invention, the unit cooler is stopped and the refrigerant is cooled by the radiator when a load loss is low, and the refrigerant is cooled by the unit cooler when the load loss is high, and accordingly, an increase in size of the stationary induction apparatus can be suppressed by the use of the small radiator while an auxiliary machinery loss is reduced.

DESCRIPTION OF EMBODIMENTS

Figure 1:
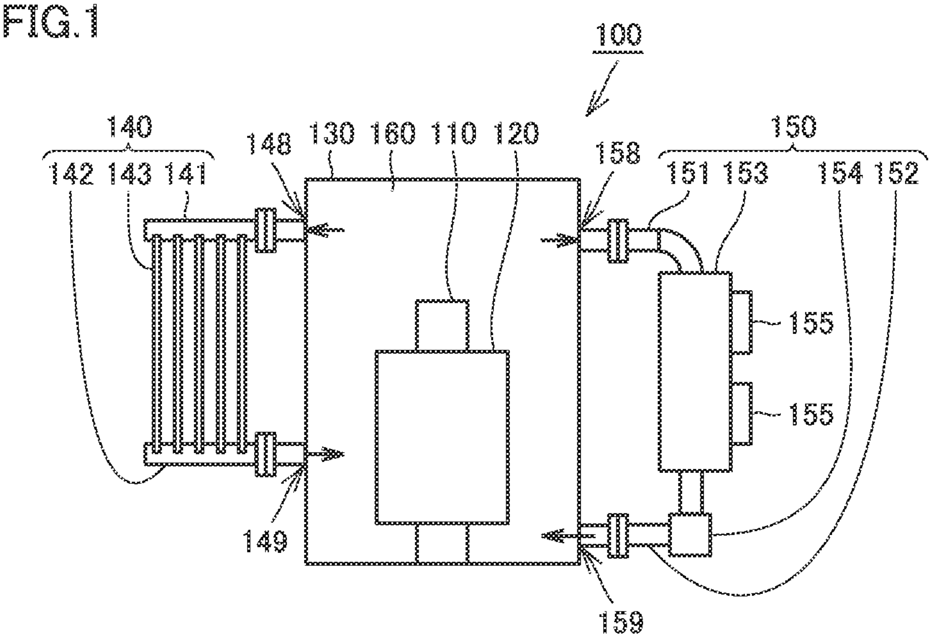
FIG. 1 is a side view showing a configuration of a stationary induction apparatus according to a first embodiment of the present invention.

Stationary induction apparatuses according to embodiments of the present invention will be described below with reference to the drawings. In the following description of the embodiments, the same or corresponding parts in the drawings are designated by the same characters and a description thereof will not be repeated. Although a core-type transformer will be described as a stationary induction apparatus example in the embodiments below, the stationary induction apparatus is not limited to a core-type transformer, and includes, for example, a shell-type transformer, a reactor, or the like.

First Embodiment

FIG. 1 is a side view showing a configuration of a stationary induction apparatus according to a first embodiment of the present invention. FIG. 1 shows a tank in a see-through view.

As shown in FIG. 1, a stationary induction apparatus 100 according to the first embodiment of the present invention includes a core 110, a winding 120, a tank 130, a refrigerant 160, a radiator 140, and a unit cooler 150.

Winding 120 is wound around core 110 as a central axis. The central axis extends in the vertical direction. Tank 130 contains core 110 and winding 120. Refrigerant 160 is filled into tank 130. Refrigerant 160 is insulating oil such as ester oil.

Radiator 140 is mounted to tank 130, and includes a first heat exchange unit 143 capable of naturally air-cooling naturally convecting refrigerant 160 while allowing refrigerant 160 to flow therethrough.

Specifically, radiator 140 includes a first header pipe 141, a second header pipe 142, and first heat exchange unit 143. First header pipe 141 and second header pipe 142 are spaced from each other in the vertical direction and extend in the horizontal direction. First heat exchange unit 143 has a plurality of flat tubes extending in the vertical direction and connecting first header pipe 141 with second header pipe 142. In first heat exchange unit 143, refrigerant 160 flowing through each of the plurality of flat tubes exchanges heat with outside air and is thereby naturally air-cooled.

Radiator 140 further has a first connection port 148 connected to tank 130, and a second connection port 149 connected to tank 130 and located below first connection port 148. Specifically, first connection port 148 is an end of first header pipe 141 on the tank 130 side. Second connection port 149 is an end of second header pipe 142 on the tank 130 side. Naturally convecting refrigerant 160 flows into radiator 140 through first connection port 148, passes through first heat exchange unit 143 and is naturally air-cooled, and flows out of radiator 140 through second connection port 149.

It is preferable that radiator 140 have low cooling capability to the extent that a temperature increase in refrigerant 160 caused by a no-load loss of stationary induction apparatus 100 can be suppressed.

Unit cooler 150 is mounted to tank 130, and includes a pump 154 that forcibly circulates refrigerant 160, and a second heat exchange unit 153 that forcibly air-cools forcibly circulated refrigerant 160 while allowing refrigerant 160 to flow therethrough. Unit cooler 150 is mounted to a side of tank 130 opposite to the side to which radiator 140 is mounted.

Specifically, unit cooler 150 includes a first connection pipe 151, a second connection pipe 152, second heat exchange unit 153, and pump 154. First connection pipe 151 and second connection pipe 152 are spaced from each other in the vertical direction. Each of first connection pipe 151 and second connection pipe 152 is connected to second heat exchange unit 153.

Second heat exchange unit 153 includes a flow pipe connected to each of first connection pipe 151 and second connection pipe 152 and through which the refrigerant flows, and a fan 155 that blows air toward the flow pipe. In second heat exchange unit 153, refrigerant 160 flowing through the flow pipe exchanges heat with outside air blown by fan 155 and is thereby forcibly air-cooled.

Unit cooler 150 further has a third connection port 158 connected to tank 130, and a fourth connection port 159 connected to tank 130 and located below third connection port 158. Specifically, third connection port 158 is an end of first connection pipe 151 on the tank 130 side. Fourth connection port 159 is an end of second connection pipe 152 on the tank 130 side. Refrigerant 160 forcibly circulated by pump 154 flows into unit cooler 150 through third connection port 158, passes through second heat exchange unit 153 and is forcibly air-cooled, and flows out of unit cooler 150 through fourth connection port 159.

Operation and effects of stationary induction apparatus 100 according to the first embodiment of the present invention are described below.

First, when a load loss is low, each of pump 154 and fan 155 of unit cooler 150 is stopped, and refrigerant 160 is cooled by radiator 140. Accordingly, the occurrence of an auxiliary machinery loss can be suppressed when the load loss is low.

When the load loss is high, on the other hand, each of pump 154 and fan 155 of unit cooler 150 is operated, and refrigerant 160 is cooled by unit cooler 150. Accordingly, the cooling capability of radiator 140 can be reduced to the extent that a temperature increase in refrigerant 160 caused by a no-load loss of stationary induction apparatus 100 can be suppressed. This can allow the use of small radiator 140, thereby suppressing an increase in size of stationary induction apparatus 100.

As described above, in stationary induction apparatus 100 according to the first embodiment of the present invention, unit cooler 150 is stopped and refrigerant 160 is cooled by radiator 140 when the load loss is low, and the refrigerant is cooled by unit cooler 150 when the load loss is high, and accordingly, an increase in size of stationary induction apparatus 100 can be suppressed by the use of small radiator 140 while the auxiliary machinery loss is reduced.

Second Embodiment

A stationary induction apparatus according to a second embodiment of the present invention is described below with reference to the drawings. The stationary induction apparatus according to the second embodiment of the present invention is mainly different from stationary induction apparatus 100 according to the first embodiment of the present invention in further including a partition plate. Thus, a description of the configuration similar to that of stationary induction apparatus 100 according to the first embodiment of the present invention will not be repeated.

Figure 2:
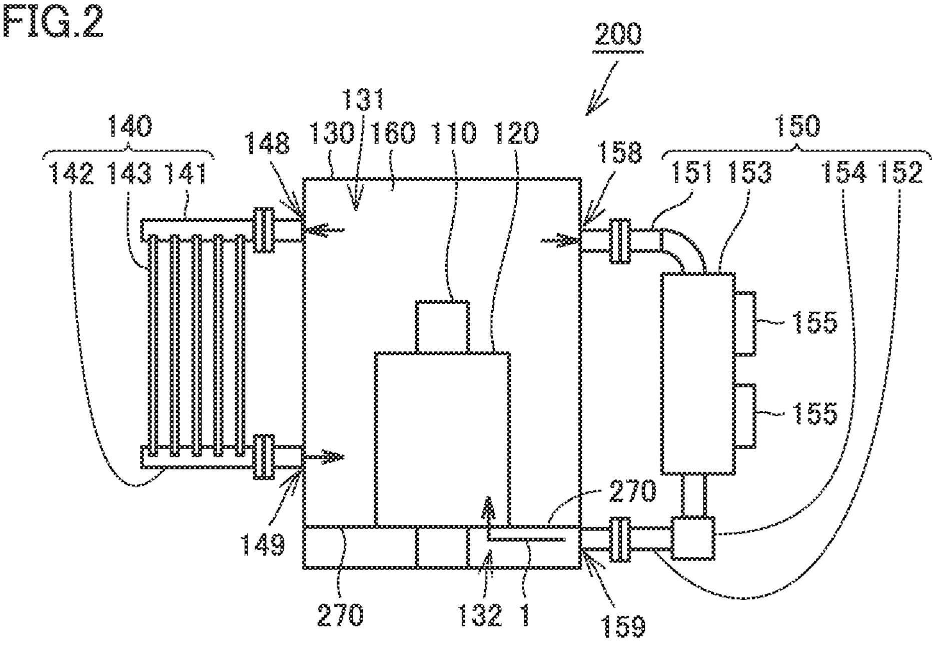
FIG. 2 is a side view showing a configuration of a stationary induction apparatus according to a second embodiment of the present invention.

FIG. 2 is a side view showing a configuration of the stationary induction apparatus according to the second embodiment of the present invention. FIG. 2 shows the tank in a see-through view.

As shown in FIG. 2, a stationary induction apparatus 200 according to the second embodiment of the present invention includes core 110, winding 120, tank 130, refrigerant 160, radiator 140, unit cooler 150, and a partition plate 270.

Partition plate 270 partitions the interior of tank 130 into an upper portion 131 and a lower portion 132 within the area where winding 120 is located in the vertical direction. In the present embodiment, partition plate 270 is disposed to extend in the horizontal direction at a position of a lower end of winding 120 in the vertical direction.

Partition plate 270 has an annular shape, and is located to fill space between an inner surface of a circumferential wall of tank 130 and an outer circumference of the lower end of winding 120.

Partition plate 270 is formed of pressboard. However, partition plate 270 is not limited to be formed of pressboard, and may be formed of an oil-resistant and heat-resistant resin plate, compressed wood, or the like.

Each of first connection port 148, second connection port 149 and third connection port 158 opens to upper portion 131 in tank 130. Fourth connection port 159 opens to lower portion 132 in tank 130.

In stationary induction apparatus 200 according to the second embodiment of the present invention, refrigerant 160 that has been cooled by unit cooler 150 flows into lower portion 132 in tank 130 through fourth connection port 159, and, as indicated by an arrow 1 in FIG. 2, passes through a position on the inner side relative to the outer circumference of winding 120 and moves upward.

Accordingly, a flow of refrigerant 160 that has flowed into tank 130 through fourth connection port 159 into radiator 140 through second connection port 149 and a resultant backflow of refrigerant 160 through radiator 140 can be suppressed. As a result, each of core 110 and winding 120 can be efficiently cooled.

In stationary induction apparatus 200 according to the second embodiment of the present invention, too, unit cooler 150 is stopped and refrigerant 160 is cooled by radiator 140 when the load loss is low, and the refrigerant is cooled by unit cooler 150 when the load loss is high, and accordingly, an increase in size of stationary induction apparatus 200 can be suppressed by the use of small radiator 140 while the auxiliary machinery loss is reduced.

Third Embodiment

A stationary induction apparatus according to a third embodiment of the present invention is described below with reference to the drawings. The stationary induction apparatus according to the third embodiment of the present invention is mainly different from stationary induction apparatus 200 according to the second embodiment of the present invention in further including a check valve. Thus, a description of the configuration similar to that of stationary induction apparatus 200 according to the second embodiment of the present invention will not be repeated.

Figure 3:
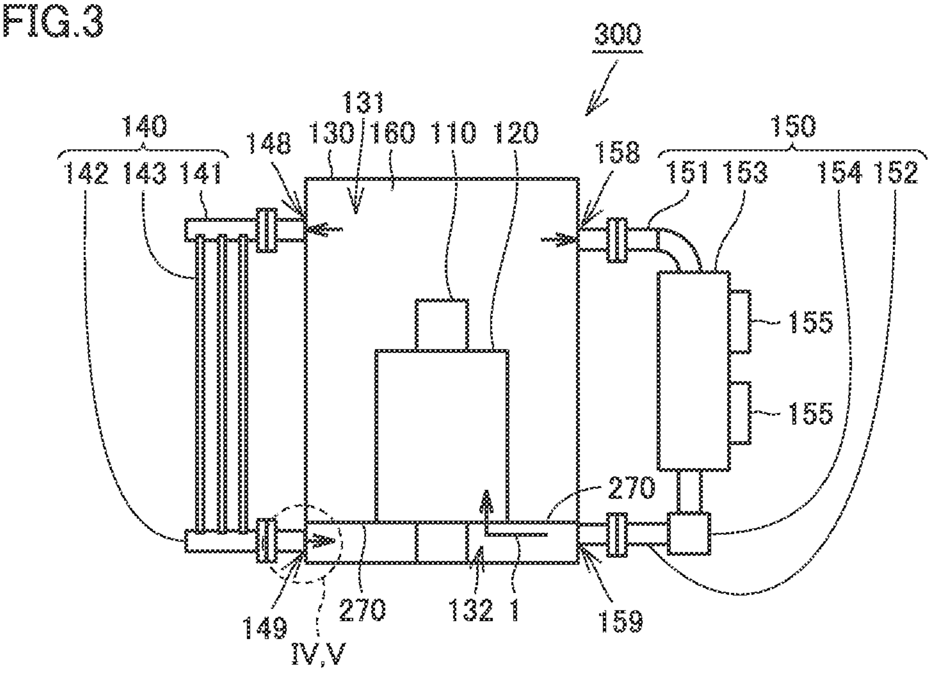
FIG. 3 is a side view showing a configuration of a stationary induction apparatus according to a third embodiment of the present invention.
Figure 4:
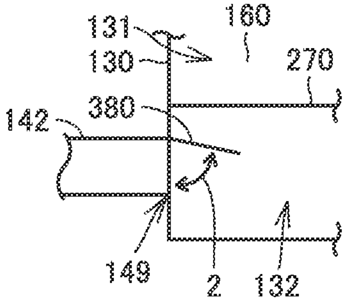
FIG. 4 is a side view showing a portion IV of the stationary induction apparatus in FIG. 3 in an enlarged manner.

FIG. 3 is a side view showing a configuration of the stationary induction apparatus according to the third embodiment of the present invention. FIG. 4 is a side view showing a portion IV of the stationary induction apparatus in FIG. 3 in an enlarged manner. FIGS. 3 and 4 show the tank in a see-through view.

As shown in FIGS. 3 and 4, a stationary induction apparatus 300 according to the third embodiment of the present invention includes core 110, winding 120, tank 130, refrigerant 160, radiator 140, unit cooler 150, partition plate 270, and a check valve 380.

Each of first connection port 148 and third connection port 158 opens to upper portion 131 in tank 130. Each of second connection port 149 and fourth connection port 159 opens to lower portion 132 in tank 130. In the present embodiment, the length of first heat exchange unit 143 in the vertical direction can be increased, and accordingly, the number of flat tubes in first heat exchange unit 143 can be lowered to reduce the width of radiator 140 while the cooling performance of refrigerant 160 in radiator 140 is maintained.

As shown in FIG. 4, second connection port 149 is provided with check valve 380 that suppresses a flow of refrigerant 160 from the second connection port 149 side to the first connection port 148 side. Specifically, check valve 380 is provided as being pivotable about an upper portion of second connection port 149 as a pivot center, as indicated by an arrow 2 in FIG. 4.

Check valve 380 is configured to open or close depending on relation of magnitude between a self-weight G of check valve 380, and a pressure P received by check valve 380 from refrigerant 160 that flows in through second connection port 149. In other words, when $G>P$ holds, check valve 380 closes second connection port 149. When $G<P$ holds, check valve 380 opens second connection port 149.

In stationary induction apparatus 300 according to the third embodiment of the present invention, during the operation of unit cooler 150, refrigerant 160 that has been cooled by unit cooler 150 flows into lower portion 132 in tank 130 through fourth connection port 159. At this time, because second connection port 149 is closed by check valve 380, refrigerant 160 passes through a position on the inner side relative to the outer circumference of winding 120 and moves upward, as indicated by an arrow 1 in FIG. 3.

Accordingly, a flow of refrigerant 160 that has flowed into tank 130 through fourth connection port 159 into radiator 140 through second connection port 149 and a resultant backflow of refrigerant 160 through radiator 140 can be suppressed. As a result, each of core 110 and winding 120 can be efficiently cooled.

When unit cooler 150 is stopped, check valve 380 opens by the pressure received from refrigerant 160 that has been cooled by radiator 140, causing refrigerant 160 to flow into lower portion 132 in tank 130 through second connection port 149, and to pass through the position on the inner side relative to the outer circumference of winding 120 and move upward.

In this manner, refrigerant 160 that has flowed into tank 130 through second connection port 149 can also be passed through the position on the inner side relative to the outer circumference of winding 120 and moved upward, and accordingly, each of core 110 and winding 120 can be efficiently cooled.

A variation of the check valve included in stationary induction apparatus 300 according to the third embodiment of the present invention is now described.

Figure 5:
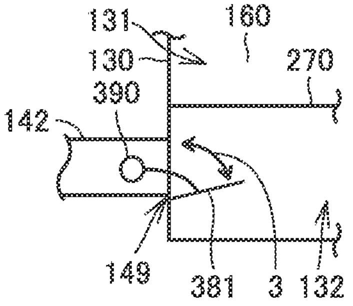
FIG. 5 is a side view showing a portion V of the stationary induction apparatus in FIG. 3 including a check valve in a variation in an enlarged manner.

FIG. 5 is a side view showing a portion V of the stationary induction apparatus in FIG. 3 including the check valve in the variation in an enlarged manner. FIG. 5 shows the tank in a see-through view.

As shown in FIG. 5, a check valve 381 in the variation is provided as being pivotable about a lower portion of second connection port 149 as a pivot center, as indicated by an arrow 3 in FIG. 5. Connected to check valve 381 is a valve lifting body 390 located inside second header pipe 142 to cause closure of check valve 381 when refrigerant 160 back-flows into second header pipe 142.

Check valve 381 closes second connection port 149 when refrigerant 160 that has flowed into lower portion 132 in tank 130 through fourth connection port 159 flows into second header pipe 142 and draws valve lifting body 390 into the back of second header pipe 142. Check valve 381 opens second connection port 149 by receiving the pressure from refrigerant 160 that flows in through second connection port 149.

The flow of refrigerant 160 from the second connection port 149 side to the first connection port 148 side can be suppressed by check valve 381 in the variation as well.

In stationary induction apparatus 300 according to the third embodiment of the present invention, too, unit cooler 150 is stopped and refrigerant 160 is cooled by radiator 140 when the load loss is low, and the refrigerant is cooled by unit cooler 150 when the load loss is high, and accordingly, an increase in size of stationary induction apparatus 300 can be suppressed by the use of small radiator 140 while the auxiliary machinery loss is reduced.

Fourth Embodiment

A stationary induction apparatus according to a fourth embodiment of the present invention is described below with reference to the drawings. The stationary induction apparatus according to the fourth embodiment of the present invention is mainly different from stationary induction apparatus 100 according to the first embodiment of the present invention in further including a first extension pipe and a second extension pipe. Thus, a description of the configuration similar to that of stationary induction apparatus 100 according to the first embodiment of the present invention will not be repeated.

Figure 6:
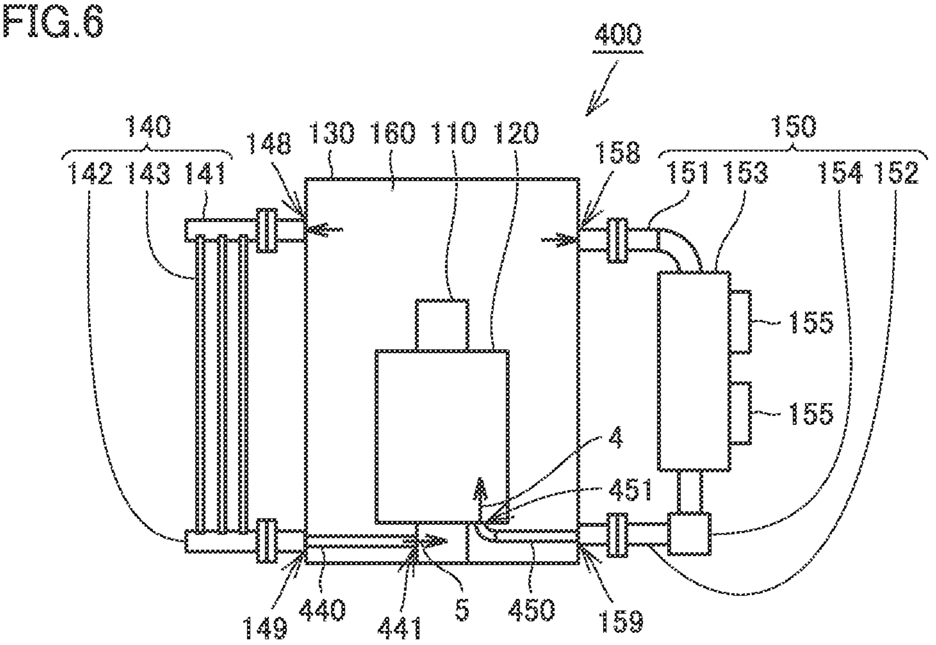
FIG. 6 is a side view showing a configuration of a stationary induction apparatus according to a fourth embodiment of the present invention.

FIG. 6 is a side view showing a configuration of the stationary induction apparatus according to the fourth embodiment of the present invention. FIG. 6 shows the tank in a see-through view.

As shown in FIG. 6, a stationary induction apparatus 400 according to the fourth embodiment of the present invention includes core 110, winding 120, tank 130, refrigerant 160, radiator 140, unit cooler 150, a first extension pipe 440, and a second extension pipe 450.

First extension pipe 440 is in communication with the interior of second connection port 149, and has an opening 441 facing a portion of core 110 that is located below winding 120. In other words, first extension pipe 440 is continuous with second header pipe 142. The interior of opening 441 in first extension pipe 440 is in communication with a gap between core 110 and winding 120.

Second extension pipe 450 is in communication with the interior of fourth connection port 159, and has an opening 451 facing a lower surface of winding 120. In other words, second extension pipe 450 is continuous with second connection pipe 152. The interior of opening 451 in second extension pipe 450 is in communication with a gap on the inner side relative to the outer circumference of winding 120.

In stationary induction apparatus 400 according to the fourth embodiment of the present invention, refrigerant 160 that has been cooled by unit cooler 150 flows into the gap on the inner side relative to the outer circumference of winding 120 through opening 451 in second extension pipe 450, and, as indicated by an arrow 4 in FIG. 6, passes through a position on the inner side relative to the outer circumference of winding 120 and moves upward.

Accordingly, winding 120 can be efficiently cooled, while a flow of refrigerant 160 that has flowed into tank 130 through opening 451 in second extension pipe 450 into radiator 140 and a resultant backflow of refrigerant 160 through radiator 140 can be suppressed.

Refrigerant 160 that has been cooled by radiator 140 flows into the gap between core 110 and winding 120 through opening 441 in first extension pipe 440, and passes through the gap between core 110 and winding 120 and moves upward, as indicated by an arrow 5 in FIG. 6. Each of core 110 and winding 120 can thereby be efficiently cooled.

In stationary induction apparatus 400 according to the fourth embodiment of the present invention, too, unit cooler 150 is stopped and refrigerant 160 is cooled by radiator 140 when the load loss is low, and the refrigerant is cooled by unit cooler 150 when the load loss is high, and accordingly, an increase in size of stationary induction apparatus 400 can be suppressed by the use of small radiator 140 while the auxiliary machinery loss is reduced.

In the foregoing embodiments, configurations that can be combined with each other may be combined as appropriate.

It is noted that the embodiments disclosed herein are illustrative in every respect, and do not serve as a basis for restrictive interpretation. Therefore, the technical scope of the present invention should not be interpreted based on the foregoing embodiments only. Further, any modifications within the scope and meaning equivalent to the terms of the claims are included.

REFERENCE SIGNS LIST

100, 200, 300, 400 stationary induction apparatus; 110 core; 120 winding; 130 tank; 131 upper portion; 132 lower portion; 140 radiator; 141 first header pipe; 142 second header pipe; 143 first heat exchange unit; 148 first connection port; 149 second connection port; 150 unit cooler; 151 first connection pipe; 152 second connection pipe; 153 second heat exchange unit; 154 pump; 155 fan; 158 third connection port; 159 fourth connection port; 160 refrigerant; 270 partition plate; 380, 381 check valve; 390 valve lifting body; 440 first extension pipe, 441, 451 opening; 450 second extension pipe.

The invention claimed is:

1. A stationary induction apparatus comprising:
a core;
a winding wound around the core as a central axis;
a tank to contain the core and the winding;
a refrigerant filled into the tank;
a radiator mounted to the tank and including
a first heat exchange unit capable of naturally air-cooling the refrigerant that is naturally convecting while allowing the refrigerant to flow therethrough; and
a unit cooler mounted to the tank and including
a pump to forcibly circulate the refrigerant, and
a second heat exchange unit to forcibly air-cool the refrigerant that is being forcibly circulated while allowing the refrigerant to flow therethrough, wherein
the central axis extends in a vertical direction,
the stationary induction apparatus further comprises a partition plate to partition an interior of the tank into an upper portion and a lower portion within an area where the winding is located in the vertical direction,
the radiator includes a first header pipe and a second header pipe spaced from each other in the vertical direction, extending in a horizontal direction, and connected to each other by the first heat exchanger,
the radiator further has a first connection port connected to the tank, and a second connection port connected to the tank and located below the first connection port,
the unit cooler has a third connection port connected to the tank, and a fourth connection port connected to the tank and located below the third connection port,
each of the first connection port and the third connection port opens to the upper portion of the tank,
each of the second connection port and the fourth connection port opens to the lower portion of the tank,
the second connection port is provided with a check valve to suppress a flow of the refrigerant from a second connection port side to a first connection port side,
the check valve is provided as being pivotable about a lower portion of the second connection port as a pivot center,
a valve lifting body located inside the second header pipe to cause closure of the check valve when the refrigerant flows into the second header pipe from the second connection port is connected to the check valve, and
the refrigerant that is naturally convecting flows into the radiator through the first connection port, and flows out of the radiator through the second connection port.

* * * * *